United States Patent [19]
Manning et al.

[11] 3,779,262
[45] Dec. 18, 1973

[54] SEISMICALLY SENSITIVE SAFETY DEVICE

[76] Inventors: John C. Manning; Mark T. Manning, both of 2512 Spruce St., Bakersfield, Calif. 93301

[22] Filed: Jan. 12, 1972

[21] Appl. No.: 217,189

[52] U.S. Cl.............................. 137/38, 200/61.45 R
[51] Int. Cl............................................. F16k 17/36
[58] Field of Search ................. 137/38, 46; 251/68; 200/61.45 R, 61.86, 61.49; 307/118; 340/17

[56] References Cited
UNITED STATES PATENTS

| | | | |
|---|---|---|---|
| 3,626,364 | 12/1971 | Simon | 340/17 |
| 2,325,725 | 8/1943 | Wood | 137/38 |
| 3,043,321 | 7/1962 | Hewitt | 137/46 |
| 2,683,001 | 7/1954 | MacIntyre | 137/38 X |
| 3,550,717 | 12/1970 | Doty, Jr. | 200/61.45 R X |

*Primary Examiner*—Robert G. Nilson
*Attorney*—Herbert A. Huebner et al.

[57] ABSTRACT

A seismically sensitive safety device adapted for connection to a line for supplying fuel, electricity or other conductible energy or energy source material having a seismic sensor capable of perceiving seismic impulses of pre-selected magnitude, a mechanism for translating the perceived seismic impulses into an electrical impulse; an electrical circuit connected to the mechanism adapted to transmit the impulse supplied by the mechanism, and a flow control in operable association with the circuit and connected to the supply line adapted to interrupt such conduction of energy or energy source material in response to receipt of such an impulse.

7 Claims, 6 Drawing Figures

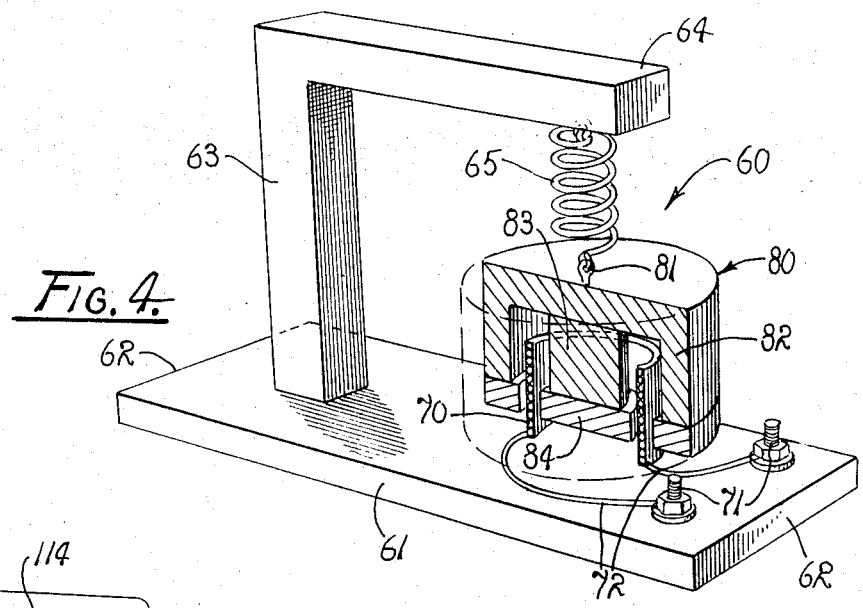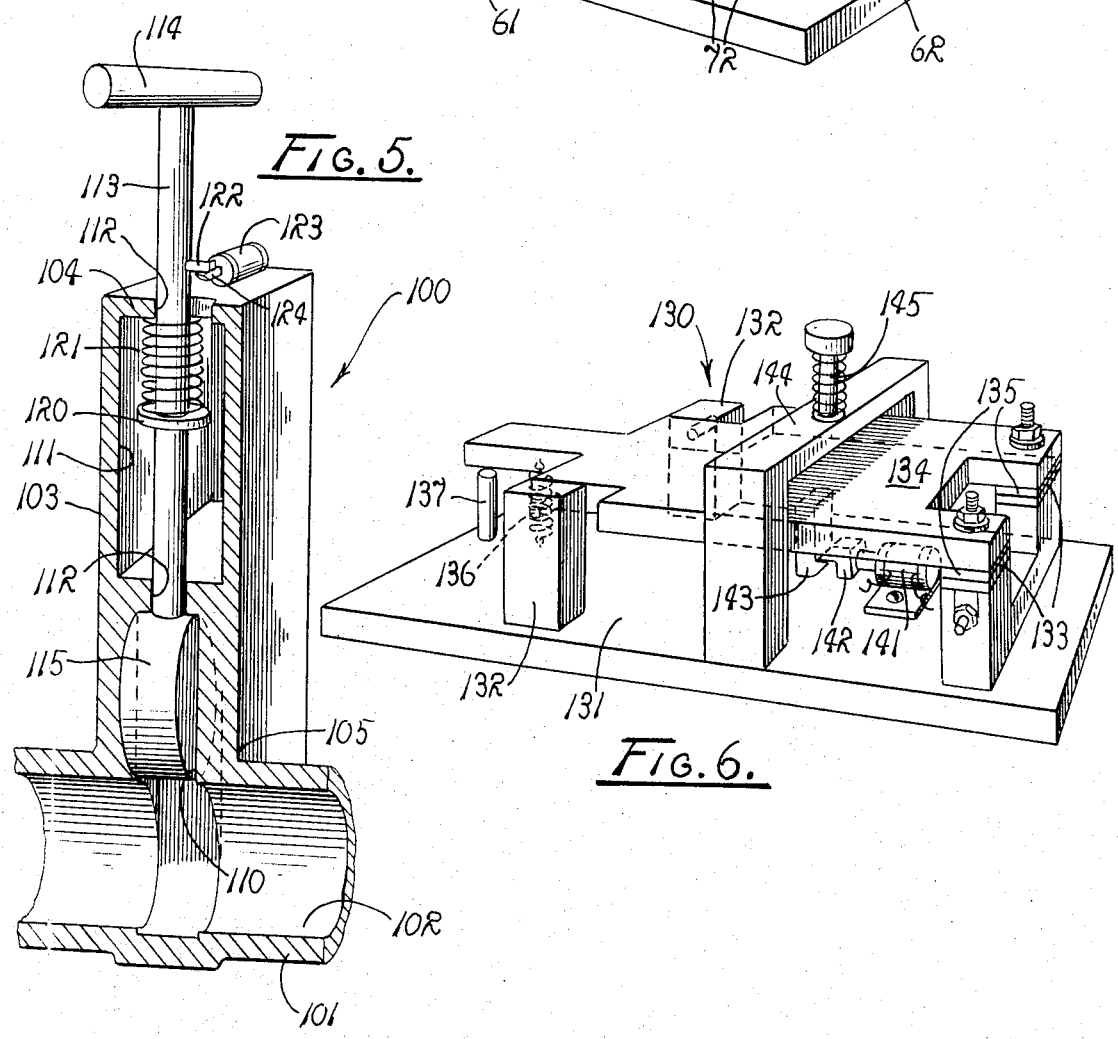

SEISMICALLY SENSITIVE SAFETY DEVICE

BACKGROUND OF THE INVENTION

While the safety defice of the present invention is referred to as seismically sensitive it is not limited to earthquake actuation and the term "seismic" is intended to be construed sufficiently broadly to encompass any source of a jolt, jar or impact sufficient for actuation. There has long been a recognized need in a variety of types of situations for a device which is sensitive to pre-selected stimulii to shut off supply lines upon the detection of those stimulii. In vehicular accidents involving, for example, automobiles, trains, and aircraft, the continuous discharge of fuel through broken lines along with the passage of electrical current through severed or exposed wires has frequently resulted in fire and explosions causing increased property damage, personal injury and loss of life. It has been recognized that if fuel and electrical systems could be shut off automatically upon impact, such damages and injury as a result of such accidents would be minimized. Similarly, such an automatic safety device has long been needed automatically to shut off supplies of materials in the case of industrial accidents involving explosions, or for automatically closing the flow valve in the case of oil well fires. During wartime, such a device has been needed at industrial sites automatically to shut off material flow upon the detection of the concussion of a bomb explosion.

In the case of natural disasters, such as earthquakes, where no warning of imminent peril is possible, there is an even greater need for such a safety device. Frequently in such disasters the greatest property damage and loss of life is caused by fire resulting from ruptured fuel and power lines rather than from the collapse of buildings as a direct result of seismic upheaval. Furthermore, water mains are frequently ruptured, causing a depletion of water supplies needed for fighting the resulting fires. As will subsequently become apparent, the installation of the safety device of the present invention in buildings, homes, factories, businesses, and the like for terminating flow of fuel, electric current, and water through their respective supply lines upon the detection of the initial, sufficiently strong seismic wave would preclude many of the catastrophic results of large earthquakes. This would be particularly true where earthquakes affect large centers of population.

SUMMARY OF THE INVENTION

It is therefore an object of the present invention to provide an automatic safety device which is capable of terminating flow along a supply line upon detection of stimulii of a pre-selected magnitude.

Another object is to provide such an automatic safety device which minimizes property damage, injuries and loss of life resulting from accidents and natural disasters of a variety of types.

Another object is to provide an automatic safety device which operates instantaneously upon the detection of pre-selected stimulii.

Another object is to provide such an automatic safety device which is completely self-contained so as to remain operable during accidents or natural disasters of a variety of types.

Another object is to provide such an automatic safety device which is of relatively inexpensive, uncomplicated construction so as to permit widespread economical use thereof.

A further object is to provide such an automatic safety device which is particularly suited for use in detecting seismic waves so as to shut off material flow from a supply source upon detection of the initial seismic impulse of predetermined magnitude.

A still further object is to provide such an automatic safety device which is easily adaptable for simultaneous operable connection to a wide variety of types of supply sources.

Further objects and advantages are to provide improved elements and arrangements thereof in a device for the purposes described which is dependable, economical, durable and fully effective in accomplishing its intended purposes.

BRIEF DESCRIPTION OF THE DRAWINGS

FIG. 4 is a perspective view of a vertical seismic sensor of the present invention with a portion thereof shown in vertical section to reveal internal structure.

FIG. 5 is a vertical section of a shut off valve utilized in the safety device.

FIG. 6 is a perspective view of an electrical disconnect relay of the automatic safety device.

DESCRIPTION OF THE PREFERRED EMBODIMENT

Figure 1:
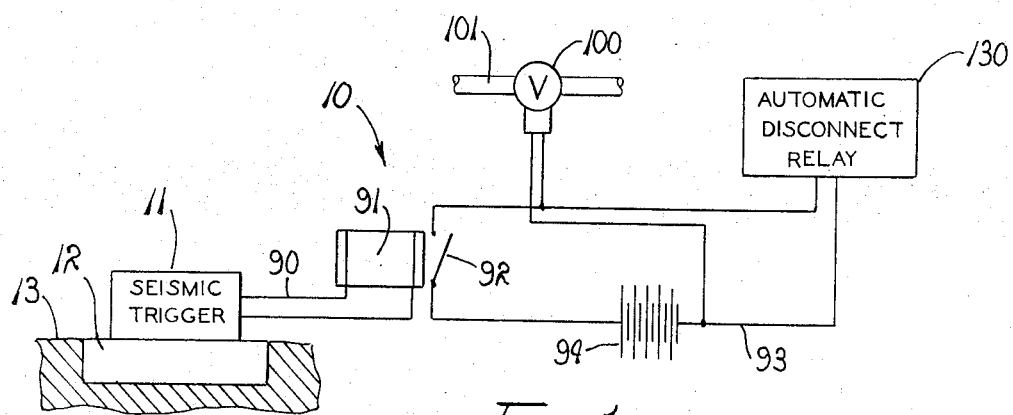
FIG. 1 is a schematic illustration of the electrical circuit of the safety device of the present invention.

Referring more particularly to the drawings, in FIG. 1 an automatic safety device of the present invention is generally indicated by the numeral 10. The safety device has a sensing system or unit 11 which is adaptable for use in detecting a wide variety of types of stimulii, depending upon the demands of the particular use involved, such as to provide protection in vehicular, accidents, industrial accidents, warfare or earthquakes. However, the unit is described for illustrative convenience as used in detecting seismic waves. So utilized, it is mounted on a concrete base 12 positioned in the ground 13, as directed by current seismological technology.

Figure 2:
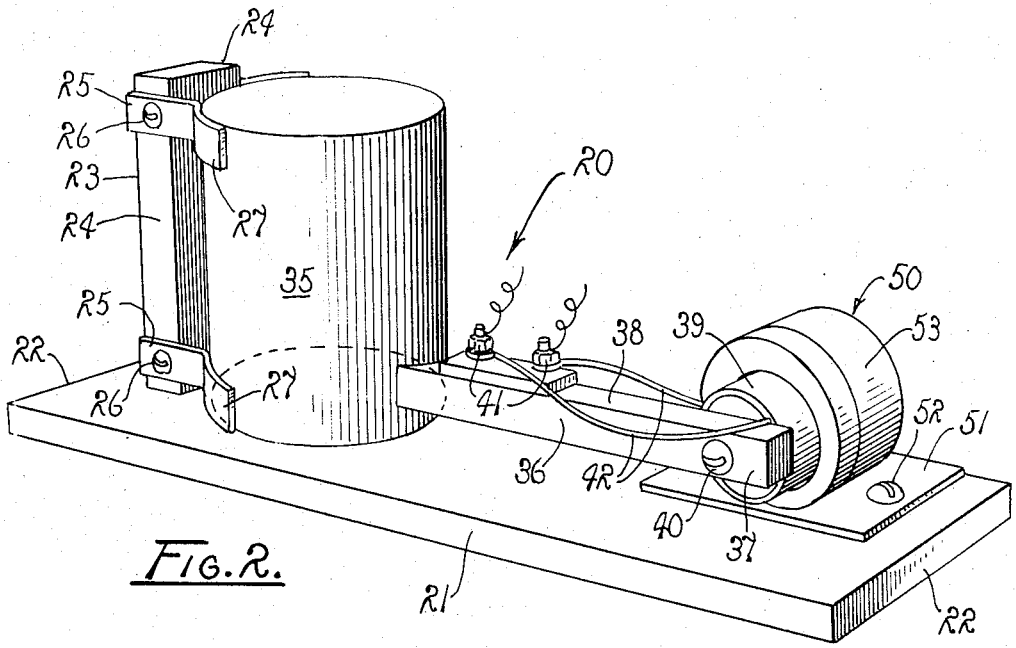
FIG. 2 is a perspective view of a horizontal seismic sensor of the present invention.
Figure 3:
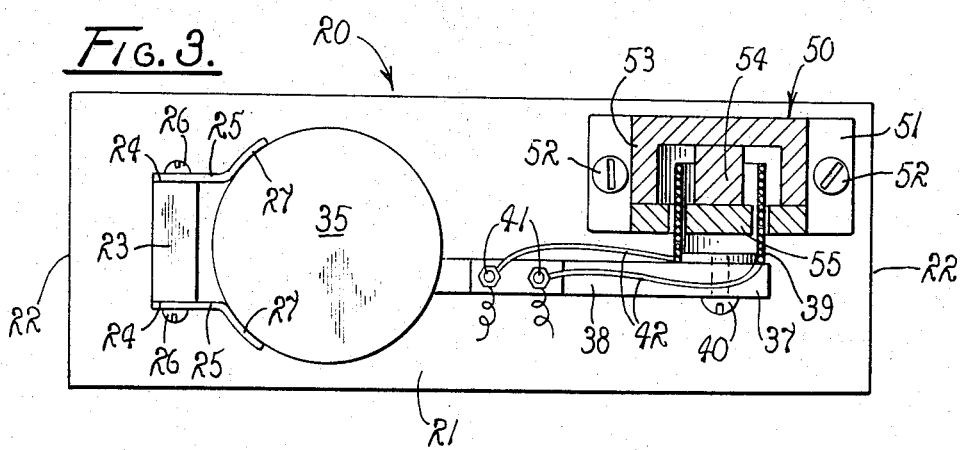
FIG. 3 is a top plan view of the horizontal seismic sensor shown in FIG. 2 with a portion thereof shown in horizontal section.

A horizontal seismic sensor 20, shown in FIGS. 2 and 3, is mounted within the sensing unit 11. The seismic sensor has a horizontal base 21 providing opposite ends 22. A vertical support 23 having opposite sides 24 is rigidly secured at one of the ends of the base, as best shown in FIG. 2. Two pairs of spring metal strips 25 are mounted on opposite sides of the vertical support in spaced relation by screws 26. The strips have arcuate mounting ends 27.

A cylindrical inertial mass 35 is mounted by any suitable means on the mounting ends 27 of the strips 25 in spaced relation from the vertical support 23 and from the base 21. The strips permit the inertial mass to be moved or vibrated horizontally relative to the vertical support to a controlled, limited degree. A rigid arm 36 is mounted on and extends horizontally from the inertial mass toward the opposite end 22 of the base. The arm has a remote portion 37 and an upper surface 38. An electric coil 39 is mounted by a bolt 40 on the distal end of the rigid arm and extends horizontally and at right angles from the arm, as best shown in FIG. 3. A pair of electrical terminals 41 are mounted on the upper surface of the arm. The coil is electrically connected to the terminals by lead wires 42.

An electrical generator 50, of which the electrical coil 39 is an operative part, is mounted on the base 21 adjacent to the distal end 37 of the arm 36. The generator has a plate 51 which is mounted on the base by screws 52. A soft iron cylinder 53 is secured on the plate and extends concentrically about the electrical coil, as best shown in FIG. 3. A cylindrical alnico magnet 54 having a soft iron end 55 extends axially through the cylinder 53 and the electrical coil, as best shown in FIG. 3.

Also mounted within the sensing unit 11 is a vertical seismic sensor 60, as shown in FIG. 4. It has a base 61 providing opposite ends 62. A support arm 62 having a distal end 64 is mounted at one of the ends of the base so that such end is a predetermined vertical distance above the base. A coil spring 65 of appropriate tension and sensitivity to respond only to strong vertical seismic waves is mounted on and extends vertically below the distal end of the support arm.

A cylindrical electrical coil 70 is mounted on the base 61 in alignment with the coil spring 65. A pair of electrical terminals 71 are mounted at the opposite end 62 of the base. Lead wires 72 electrically connect the coil to the terminals.

An electrical generator 80 of which the electrical coil 70 is an operable part, is pendantly supported on the coil spring 65 by a fastening eyelet 81. The generator has a soft iron cylinder 82 which extends concentrically about the coil 70. An alnico magnet 83 having a soft iron end 84 extends axially through the cylinder and electrical coil, as best shown in FIG. 4.

It will be understood that a variety of types and designs of seismic sensors or triggers can be used in the sensing unit 11 depending upon the demands of the particular environment and impulse to be sensed. The seismic sensors can be of a commercial type which is adjustable to trigger at various magnitudes of seismic waves.

The horizontal seismic sensor 20 and the vertical seismic sensor 60 are connected electrically in parallel through a circuit 90, to the operating coil of a relay 91. If desired, any suitable means for amplifying the minute currents generated by disturbance of the sensor 20 or 60, not shown, can be utilized in the circuit 90. The relay is adapted to close a normally open switch 92 upon being energized. Closing of the switch 92 completes an electrical circuit 93, best shown in FIG. 1. The switch is adapted to remain closed only so long as held by the relay. A battery 94 is provided in the circuit 93 in series with the switch as a source of energy.

An electrically controlled shut off valve 100 is located in a gas or liquid fuel line 101, as shown in FIG. 1 and electrically connected in the circuit 93 in series with the battery 94 and switch 92. The valve may be of any suitable form having a closable passage 102 therethrough but can readily have the form shown in FIG. 5 providing a housing 103 having an upper end 104 and a lower end 105. A vertical valve slot 110 is provided at the lower end of the housing and communicates with the internal passage of the gas conduit. The housing has a spring compartment 111 adjacent to the upper end of the housing. A pair of vertically aligned guide bores 112 are provided in the housing at opposite ends of the spring compartment. A plunger 113 having a handle 114 at one end thereof and a valve 115 at the other end thereof is mounted for vertical movement in the guide bores of the housing. A spring seat 120 is mounted about the plunger 113 within the compartment 111. A spring 121 is received between the spring seat and the upper end 104 of the housing 103 so as to urge the valve 115 of the plunger downwardly in the housing. A pin 122 is affixed at right angles to the plunger adjacent to the handle 114. A solenoid 123, having a retractable latch 124, is mounted on the upper end 104 of the housing with the latch extended under the pin of the plunger 113 so as to maintain the plunger in the upwardly extended position with the valve 115 received in the valve slot 110, as shown in FIG. 5. The solenoid is of the impulse actuated type adapted to retract the latch upon energization. The solenoid is connected to the electrical circuit 93 in series with the battery 94 and switch 92.

A power shut off switch or disconnect relay 130, shown in FIGS. 1 and 6, is connected in the circuit 93 in parallel with the solenoid 123. The relay has a base 131 having spaced, parallel upright supports 132 mounted adjacent to one end thereof. A pair of fixed electrical contacts 133 are mounted adjacent to the other end of the base in upwardly extending relation. A switch 134 is pivotally mounted on the upright supports and has a pair of electrical contacts 135 at one end thereof which are positionable with the switch to engage the fixed electrical contacts 133 of the base. A tension spring 136 interconnects the end of the switch opposite that having the contacts and the base so as to maintain the switch with the electrical contacts 133 and 135 out of engagement with each other when not otherwise held in position. A stop 137 is mounted on the base adjacent to the tension spring and is adapted to limit pivotal movement of the switch on the upright supports when pivoted by the spring.

A solenoid 141 having a retractable latch 142 is connected in the circuit 93 in parallel with the solenoid 123 and is mounted on the base 131 of the disconnect relay 130 below the switch 134 and adjacent to the fixed electrical contacts 133. A catch 143 extends below the switch and connects with the retractable latch when the switch is motivated to a position in which the contacts 135 engage the fixed electrical contacts 133 of the base. A mount 144 extends above the switch in vertical alignment with the catch and affords a spring actuated plunger 145 extending therethrough and positionable to motivate the switch from a raised position to a latched position shown in FIG. 6. The disconnect relay 130 is connected in an electrical power supply or other power line, not shown, which it is desired to interrupt in the event of an emergency.

OPERATION

The operation of the described embodiment of the subject invention is believed to be clearly apparent and is briefly summarized at this point. With the automatic safety device 10 installed as described, it uses no power until either the sensor 20 or 60 is actuated by receipt of a seismic impulse sufficient to actuate it. Furthermore, operation of the device requires no external sources of power subject to malfunction because of earthquake damage or the like. The electrical generators 50 and 80 and the battery 94 make the device entirely self sufficient.

Seismic waves are communicated to the sensing unit 11 through the ground surface 13 and concrete base 12. Depending upon the type of seismic wave, the inertial mass 35 of the horizontal seismic sensor 20 or the soft iron cylinder 82 of the vertical seismic sensor 60 is caused to oscillate. In the horizontal seismic sensor, such oscillation causes the rigid arm 36 to move the coil 39 of the generator 50 in a limited reciprocal motion within the cylinder 53 and about the alnico magnet 54. Such reciprocal movement of the coil in the magnetic field about the magnet generates an electrical current. Such current is conveyed along the lead wires 42 to the terminals 41 on the rigid arm. Similarly, in the vertical seismic sensor 60, the movement of the cylinder 82 about the coil 70 with the alnico magnet 83 extending through the electrical coil generates an electrical current in the coil. Such current is conducted along the lead wires 72 to the electrical terminals 72.

The current generated by the horizontal seismic sensor 20 and/or the vertical seismic sensor 60 is conveyed through the electrical circuit 90 to operate the relay 91 to close the switch 92. Closure of the switch may be only momentary, depending upon the strength and duration of the seismic waves operating the electrical generators 50 and 80. However, initial closure of the switch is all that is necessary in order to allow the automatic safety device 10 to perform its intended function.

Closure of the switch 92 causes current to flow from the battery 94, through the circuit 93 to supply such current to the solenoid 123 of the gas shut off valve 100 and to the solenoid 141 of the disconnect relay 130. In the shut off valve the solenoid is thereby actuated to retract the latch 124. Such retraction causes the latch to be drawn away from the pin 122, thereby allowing the spring 121 to move the plunger 113 downwardly in the housing 103 to position the valve 115 in sealing relation to the passage 102. Simultaneously, the receipt of current by the solenoid 141 of the disconnect relay causes the retractable latch 142 thereof to be drawn away from the catch 143, thereby causing the spring 136 to pivot the switch 134 so that the contacts 135 are drawn away from the fixed electrical contacts 133.

The operation of the automatic safety device 10 in the above described manner through instantaneous and automatic closing of the valve 100 and the switch 134 causes the flow of gas in the gas conduit 101 and the flow of electricity through the switch 134 to be terminated upon the detection by the sensing unit 11 of a seismic wave of predeterined magnitude. The detection of further seismic waves causes the relay 91 to close the switch 92 in the same manner as described. However, such closure of the switch will not further affect the operation of the gas shut off valve 100 and the disconnect relay 130 since they have been operated by the initially detected seismic wave and interrupt their respective supply lines until reset.

Re-establishment of the supply of gas throughh the gas conduit 101 and of electric power through the switch 134 is accomplished manually. In the gas shut off valve, the handle 114 is employed to draw the plunger 113 upwardly in the housing 103 until the pin 122 is drawn past the retractable latch 124, thereby maintaining the plunger in the upwardly disposed position, as shown in FIG. 5. In the disconnect relay 130, the spring actuated plunger 145 is operated to push the switch 134 downwardly to reestablish contact between the electrical contacts 133 and 135 and to re-connect the catch 143 with the retractable latch 142, as shown in FIG. 6. The necessity for such manual reopening of the supply systems insures that they will not inadvertently be operated during seismic upheaval by an accidental discharge of power through some circuit designed for the function of re-establishing the flow of power and gas.

The automatic safety device 10 is adapted to accomplish its described safety operations in different environments. On vehicles of various sorts, the sensing unit 11 is capable of detecting the shock of a collision and the device is connected to fuel lines and electrical circuits of such vehicles. At industrial sites, the described sensing unit is sensitive to the detection of the concussion from an explosion. At oil wells, the sensing unit is sensitive to the detection of the concussion of explosions or "blow outs." In all such environments, the device operates substantially in the same manner to terminate flow along a supply line to which it is connected upon the initial detection of the impulse of predetermined magnitude.

Since the automatic safety device operates instantaneously upon the detection of the triggering stimulii, the termination of flow of fuel and electrical energy from the supply sources is ordinarily accomplished prior to or concurrently with the severing of their conduits or circuits, thereby avoiding fire normally resulting from such rupture or severing. Consequently, the property damage, personal injury and loss of life usually resulting therefrom are minimized or avoided. Similarly, as in the case of earthquakes, when the safety devices are employed in water systems, their various segments are automatically and instantaneously isolated. Thus, if rupturing of the water lines occurs, the water supply is not depleted and the various segments can be manually turned back on for use if not ruptured.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. A seismically sensitive safety device comprisng sensing means for detecting horizontal and vertical seismic impulses in excess of a predetermined threshold and translating such a detected impulse whether horizontal or vertical into an electric signal, said sensing means including an inertial mass mounted for movement by the seismic impulses in excess of the threshold and the sensing means further including means mounted adjacent to the mass for the generation of electrical energy upon movement of the mass; an electrically operable flow control means adapted for connection to a supply line through which fluid, electricity or the like is conducted; and electrically conductive means interconnecting the sensing means and the control means for conducting the electric signal from the sensing means to actuate the control means.

2. The safety device of claim 1 in which the flow control means comprises an electrically operated shut off valve.

3. The safety device of claim 1 in which the flow control means includes an electric shut off switch connected in controlling relation to an electric supply line.

4. A seismically sensitive safety device adapted for connection to a supply line comprising a seismic sensor for perceiving a seismic impulse of predetermined magnitude and translating the perceived impulse into an electrical impulse; an electrically operable flow control valve connected to the supply line; electrically conductive means interconnecting the sensor and the valve for actuating the valve in response to receipt by the sensor of a seismic impulse of predetermined magnitude including a relay operably connected to the sensor and a source of additional electrical energy connected in series with the relay and the valve; and an electrical generating means included in the sensor actuated by a seismic impulse received by the sensor to produce an electrical impulse and said generating means is connected to the relay to close the relay upon receipt of the impulse from the generating means to complete the series circuit through the relay, the source of additional electrical energy and the valve.

5. The safety device of claim 4 in which the source of additional electrical energy is a battery.

6. The safety device of claim 5 in which an electrically operable power shut off switch is connected to an electrical power supply and to the circuit in parallel to the valve for simultaneous actuation with the valve.

7. A seismically sensitive safety device comprising a seismic sensor including electrical generating means actuated by seismic impulses of at least a predetermined magnitude; a normally open relay connected to the generating means closed by actuation thereof; and a series circuit including an electrically actuated, normally open safety valve, an additional source of electrical energy and the relay, said circuit being completed by the closing of the relay to close the safety valve and being interrupted by opening of the relay.

* * * * *

UNITED STATES PATENT OFFICE
CERTIFICATE OF CORRECTION

Patent No. 3,779,262       Dated December 18, 1973

Inventor(s) John C. Manning; Mark T. Manning

It is certified that error appears in the above-identified patent and that said Letters Patent are hereby corrected as shown below:

In the Specification:

Column 2, line 68, delete "electric" and insert ---electrical---.

Column 3, line 18, after "arm" and before "having" delete "62" and insert ---63---.

Column 5, line 20, after "terminals" delete "72" and insert ---71---.

Column 5, line 51, delete "predeterined" and insert ---predetermined---.

Column 5, line 59, delete "throughh" and insert ---through---.

Signed and sealed this 9th day of April 1974.

(SEAL)
Attest:

EDWARD M. FLETCHER, JR.
Attesting Officer

C. MARSHALL DANN
Commissioner of Patents